(12) United States Patent
Knorrn

(10) Patent No.: US 12,466,445 B2
(45) Date of Patent: Nov. 11, 2025

(54) DRIVING ASSISTANCE SYSTEM AND DRIVING ASSISTANCE METHOD FOR A VEHICLE

(71) Applicant: Bayerische Motoren Werke Aktiengesellschaft, Munich (DE)

(72) Inventor: Robert Knorrn, Oberhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 18/684,306

(22) PCT Filed: Aug. 29, 2022

(86) PCT No.: PCT/EP2022/073894
§ 371 (c)(1),
(2) Date: Feb. 16, 2024

(87) PCT Pub. No.: WO2023/031086
PCT Pub. Date: Mar. 9, 2023

(65) Prior Publication Data
US 2024/0351618 A1    Oct. 24, 2024

(30) Foreign Application Priority Data

Aug. 31, 2021  (DE) .................. 10 2021 122 471.3

(51) Int. Cl.
*B60W 60/00* (2020.01)
*B60K 35/10* (2024.01)
(Continued)

(52) U.S. Cl.
CPC ......... *B60W 60/0051* (2020.02); *B60K 35/10* (2024.01); *B60K 35/22* (2024.01);
(Continued)

(58) Field of Classification Search
None
See application file for complete search history.

(56) References Cited

U.S. PATENT DOCUMENTS

2018/0088572 A1*  3/2018  Uchida ................. B60W 30/16
2018/0208212 A1    7/2018  Suessenguth et al.
(Continued)

FOREIGN PATENT DOCUMENTS

DE   10 2009 033 752 A1   1/2011
DE   10 2015 218 444 A1   3/2017
(Continued)

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (2 pages).
(Continued)

*Primary Examiner* — James J Lee
*Assistant Examiner* — Andrew Sang Kim
(74) *Attorney, Agent, or Firm* — Crowell & Moring LLP

(57) ABSTRACT

Methods, systems, and apparatuses for a driving assistance system of a vehicle are provided. A user input is received to select an automated driving mode from two or more different automated driving modes. A determination is made as to whether the selected automated driving mode is available when selected by the user input. If the selected automated driving mode is available when selected by the user input, activating the selected automated driving mode is postponed for a first time interval. Alternatively, if the selected automated driving mode is unavailable when selected by the user input, attempting to activate the selected automated driving mode is postponed for a second time interval that is longer than the first time interval.

10 Claims, 3 Drawing Sheets

(51) Int. Cl.
    *B60K 35/22*     (2024.01)
    *B60K 35/28*     (2024.01)
    *B60W 50/14*     (2020.01)

(52) U.S. Cl.
    CPC ............ *B60K 35/28* (2024.01); *B60W 50/14* (2013.01); *B60K 2360/172* (2024.01); *B60K 2360/175* (2024.01); *B60W 2050/146* (2013.01)

(56) References Cited

U.S. PATENT DOCUMENTS

| | | |
|---|---|---|
| 2018/0319402 A1 | 11/2018 | Mills et al. |
| 2020/0062278 A1 | 2/2020 | Kuenzner |
| 2022/0185338 A1* | 6/2022 | Stenneth ........... B60W 60/0055 |
| 2022/0234448 A1 | 7/2022 | Jauch et al. |

FOREIGN PATENT DOCUMENTS

| | | |
|---|---|---|
| DE | 10 2017 208 506 A1 | 11/2018 |
| DE | 10 2018 110 629 A1 | 11/2018 |
| DE | 10 2019 208 443 A1 | 12/2020 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

International Search Report (PCT/ISA/210) issued in PCT Application No. PCT/EP2022/073894 dated Dec. 6, 2022 with English translation (6 pages).

German-language Written Opinion (PCT/ISA/237) issued in PCT Application No. PCT/EP2022/073894 dated Dec. 6, 2022 with English translation (10 pages).

German-language Search Report issued in German Application No. 10 2021 122 471.3 dated Jul. 20, 2022 with partial English translation (10 pages).

* cited by examiner

DRIVING ASSISTANCE SYSTEM AND DRIVING ASSISTANCE METHOD FOR A VEHICLE

BACKGROUND AND SUMMARY

The present subject matter relates to a driving assistance system for a vehicle, to a vehicle having such a driving assistance system, to a driving assistance method for a vehicle and to a storage medium for carrying out the driving assistance method. The present subject matter relates in particular to a change or changeover between different automated driving modes.

Driving assistance systems for automated driving are becoming increasingly important. Automated driving may take place with different degrees of automation. Examples of degrees of automation are assisted, partly automated, conditionally automated, highly automated or fully automated driving. These degrees of automation have been defined by the German Federal Highway Research Institute (BASt) (see the BASt publication "Forschung Kompakt" [Compact Research], issued November 2012). By way of example, Level 4 vehicles are already operating fully autonomously in urban traffic.

In modern vehicles, there may nowadays be a large number of different automated driving modes that are present and able to be activated, such as for example a lane keep assistant, a cruise control system and a speed limiter. The driver is generally able to select a desired automated driving mode using a corresponding user interface, this driving mode then being activated by the driving assistance system. However, if the selected automated driving mode is unavailable, a corresponding error message is displayed to the driver. This may lead to inconvenience for the driver.

One object of the present subject matter is to specify a driving assistance system for a vehicle, a vehicle having such a driving assistance system, a driving assistance method for a vehicle and a storage medium for carrying out the driving assistance method, all of which make it possible to improve a selection of an automated driving mode from a multiplicity of different automated driving modes.

One object of the present subject matter is in particular to reduce the occurrence of error messages when selecting an automated driving mode and/or when changing between different automated driving modes.

This object is achieved by the subject matter of the independent claims. Advantageous examples are specified in the dependent claims.

According to one independent aspect of the present subject matter, what is specified is a driving assistance system for a vehicle, in particular a motor vehicle. The driving assistance system comprises at least one user interface that is configured to receive a user input for the purpose of selecting an automated driving mode from two or more different automated driving modes and/or user inputs for the purpose of changing between the two or more different automated driving modes; and at least one processor unit that is configured: following a user input for the purpose of selecting an automated driving mode, to postpone activating the selected automated driving mode for a first time interval if the selected automated driving mode is available when selected by the user input; and following a user input for the purpose of selecting an automated driving mode, to postpone attempting to activate the selected automated driving mode for a second time interval if the selected automated driving mode is unavailable when selected by the user input, wherein the second time interval is longer than the first time interval.

According to the present subject matter, different time intervals are provided for the activation of an automated driving mode selected by a user depending on whether or not the selected automated driving mode is available at the time of selection. If the selected automated driving mode is available at the time of selection, the time interval until activation is shorter than if the selected automated driving mode is unavailable.

By way of example, the selected automated driving mode may be only briefly or temporarily unavailable. Due to the longer time interval between selection and activation attempt, the activation attempt possibly starts only when the initially unavailable selected automated driving mode is available again.

In a further example, the selected automated driving mode may be permanently unavailable. Due to the longer time interval between selection and activation attempt, the user has more time to recognize this circumstance, for example by way of a corresponding indication on a display, and to select another automated driving mode, without an attempt to activate the unavailable automated driving mode being made.

As a result, it is possible to reduce the occurrence of error messages to the user indicating a failed activation attempt.

At the time of selection of the automated driving mode by the user, the vehicle may be being operated in a manual mode, that is to say be being controlled by the driver. As an alternative, at the time of selection of the automated driving mode, the vehicle may already be being operated in a different automated driving mode by the user, that is to say a change may take place between two different automated driving modes.

The term "time interval", as used in the context of the present subject matter, indicates a duration between the selection of the automated driving mode by way of the user input and activation of or an attempt to activate the automated driving mode, that is to say the beginning of the active control. The time interval may for example correspond to a debouncing time or be a debouncing time.

Preferably, the first time interval, if the selected automated driving mode is available, is 2 seconds or less, in particular 1 second or less.

Due to the first time interval, a change does not take place to the active control mode immediately, but rather only after the predefined time has elapsed. This allows the user to skip successively through a list of automated driving modes, without each automated driving mode being activated immediately. In other words, the user is able to skip over automated driving modes without these being activated.

Preferably, the second time interval, if the selected automated driving mode is unavailable, is 10 seconds or less, in particular 5 seconds or less or 2 seconds or less.

The unavailability of the automated driving mode may be down to various reasons. By way of example, there may be a technical fault state, which may be temporary or permanent. A temporary fault state may be present for example when the reliability of sensor data from a surroundings sensor system is insufficient, for example because the surroundings sensor system is influenced by current weather conditions such as snow or rain. A permanent fault state may be present for example when the surroundings sensor system is defective.

The present subject matter is however not limited to the abovementioned examples, and unavailability of the automated driving mode may be down to other causes that prevent or do not allow activation of the automated driving mode.

Preferably, the two or more different automated driving modes are able to be selected successively using the user interface. The selection may in particular be made by "toggling" or "mode toggling", in which for example a cursor skips through a list of different automated driving modes through a repeated user input.

Preferably, the user interface comprises at least one display device that is configured to display the two or more different automated driving modes for selection by the user.

In some examples, the at least one display device may be configured to display a list of the two or more different automated driving modes. Through repeated user inputs, such as for example by actuating a mode switch, the user is able to skip successively through the list and select an automated driving mode.

Preferably, the display of the two or more different automated driving modes on the at least one display device comprises an availability state of each automated driving mode (for example "available" or "unavailable"). In other words, the user is able to be informed about the availability state of the individual driving modes. Due to the longer time interval between selection of and attempt to activate unavailable automated driving modes, the user has more time to select another (available) automated driving mode without an attempt to activate the unavailable automated driving mode taking place. This makes it possible to reduce the occurrence of error messages to the user indicating a failed activation attempt.

Preferably, the at least one display device is a display of an infotainment system. The display is typically installed in or on the dashboard of the vehicle. The display may for example be a head unit. In some examples, the display is an LCD display, a plasma display or an OLED display.

Preferably, the at least one display device is selected from the group comprising or consisting of a projection device, a display, an augmented reality (AR) device, a head-up display (HUD) and combinations thereof. By way of example, the at least one display device may be an AR-HUD or a panoramic HUD (that is to say an HUD mirrored into a front windscreen). The panoramic HUD is an HUD mirrored into a front windscreen or an HUD mirrored into the front windscreen base over the entire width.

Preferably, the user interface comprises an actuator that is provided for the user input for the purpose of selecting an automated driving mode and/or changing between two or more different automated driving modes. The actuator may be a tactile actuation element, such as for example a switch, a button or a rotary knob. As an alternative, the actuator may be provided by a touchscreen of the user interface, in particular of the at least one display device.

Preferably, the user interface is configured to output a message to the user when the attempt to activate the selected automated driving mode after the second time interval has elapsed fails. The message may be output acoustically and/or optically and/or haptically to the driver, for example through an appropriate display on the at least one display device.

The driving assistance system is configured for automated driving.

The term "automated driving" in the context of this document may be understood to mean driving with automated longitudinal or transverse guidance or autonomous driving with automated longitudinal and transverse guidance. Automated driving may involve for example driving for a relatively long time on the motorway or time-limited driving as part of parking or maneuvering. The term "automated driving" comprises automated driving with any degree of automation. Examples of degrees of automation are assisted, partly automated, highly automated or fully automated driving. These degrees of automation have been defined by the German Federal Highway Research Institute (BASt) (see the BASt publication "Forschung Kompakt" [Compact Research], issued November 2012).

In the case of assisted driving, the driver continuously performs longitudinal or transverse guidance while the system takes over the respective other function within certain limits. In the case of partly automated driving (TAF), the system takes over the longitudinal and transverse guidance for a certain duration and/or in specific situations, wherein the driver has to continuously monitor the system as in the case of assisted driving. In the case of highly automated driving (HAF), the system takes over the longitudinal and transverse guidance for a certain duration without the driver having to continuously monitor the system; the driver must however be capable within a certain time of taking over vehicle guidance. In the case of fully automated driving (VAF), the system is able to automatically manage driving in all situations for a specific application case; a driver is then no longer required for this application case.

The four degrees of automation mentioned above correspond to SAE Levels 1 to 4 of the SAE J3016 standard (SAE—Society of Automotive Engineering). By way of example, highly automated driving (HAF) corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is then generally no longer required.

The driving assistance system of the present subject matter is configured to implement two or more different automated driving modes that the user is able to select and/or between which the user is able to change.

In some examples, at least two of the different automated driving modes have different degrees of automation. By way of example, at least one of the automated driving modes may operate according to SAE Level 1, and at least one other of the automated driving modes may operate according to SAE Level 2.

In other examples, all of the different automated driving modes have the same degree of automation. By way of example, all different automated driving modes may operate according to SAE Level 1 (for example cruise control system and lane keep assistant) or SAE Level 2.

Preferably, the two or more different automated driving modes are selected from the group comprising or consisting of a speed limiter, a cruise control system, an automatic distance control system, a lane keep assistant and combinations thereof.

The at least one processor unit is a programmable arithmetic unit, that is to say a machine or an electronic circuit, that controls other elements according to commands that are given and in the process expedites an algorithm (process).

According to a further independent aspect of the present subject matter, what is specified is a vehicle, in particular a motor vehicle. The vehicle comprises the driving assistance system according to the examples of the present subject matter.

The term vehicle comprises cars, trucks, buses, RVs, motorcycles, etc. that are used to transport people, goods, etc. The term in particular comprises motor vehicles for transporting people.

According to a further independent aspect of the present subject matter, what is specified is a driving assistance method for a vehicle, in particular a motor vehicle. The driving assistance method comprises receiving a user input for the purpose of selecting an automated driving mode from two or more different automated driving modes and/or changing from a first (currently active) automated driving mode to a second (currently not active) automated driving mode; determining whether the selected automated driving mode is available when selected by the user input; and:
- if the selected automated driving mode is available when selected by the user input, postponing activating the selected automated driving mode for a first time interval, or
- if the selected automated driving mode is unavailable when selected by the user input, postponing attempting to activate the selected automated driving mode for a second time interval that is longer than the first time interval.

The driving assistance method may implement the aspects of the driving assistance system described in this document.

According to a further independent aspect of the present subject matter, what is specified is a software (SW) program. The SW program may be configured to be executed on one or more processors in order thereby to carry out the driving assistance method described in this document.

According to a further independent aspect of the present subject matter, what is specified is a storage medium. The storage medium may comprise an SW program that is configured to be executed on one or more processors in order thereby to carry out the driving assistance method described in this document.

According to a further independent aspect of the present subject matter, what is specified is software containing program code for performing the driving assistance method for the automated driving of a vehicle when the software runs on one or more software-controlled apparatuses.

DETAILED DESCRIPTION OF THE DRAWINGS

Unless indicated otherwise, the same reference signs are used for identical and functionally identical elements below.

Figure 1:
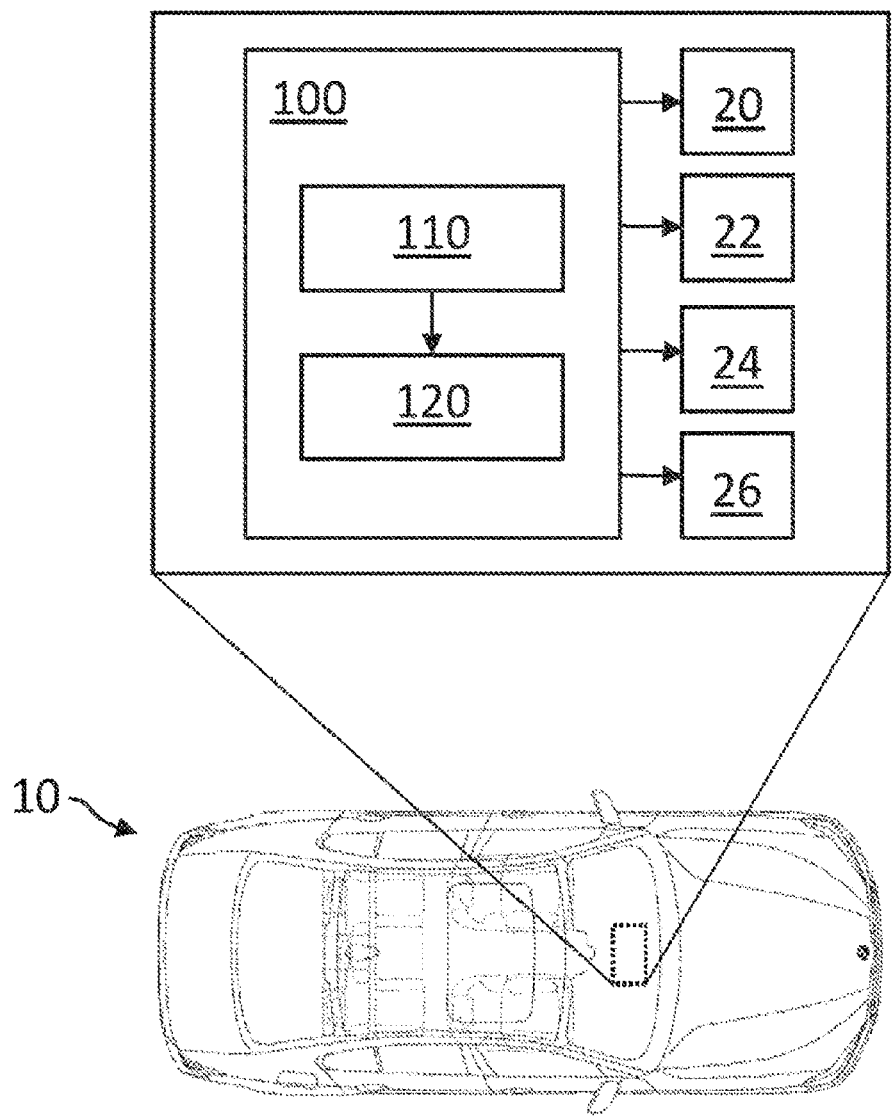
FIG. 1 schematically shows a vehicle having a driving assistance system for automated driving according to examples of the present subject matter.

FIG. 1 schematically shows a vehicle 10 having a driving assistance system 100 for automated driving according to examples of the present subject matter.

In the case of automated driving, the longitudinal and/or transverse guidance of the vehicle 10 takes place automatically. The driving assistance system 100 thus takes over the vehicle guidance. For this purpose, the driving assistance system 100 controls the drive 20, the transmission 22, the hydraulic service brake 24 and/or the steering system 26 using intermediate units, not illustrated.

In order to plan and perform the automated driving, environment information from a surroundings sensor system that observes the vehicle environment is received by the driver assistance system 100. The surroundings sensor system may for example comprise at least one lidar system and/or at least one radar system and/or at least one exterior camera and/or at least one ultrasound system and/or at least one laser scanner.

The driving assistance system 100 comprises at least one user interface 110 that is configured to receive user inputs for the purpose of changing between two or more different automated driving modes; and at least one processor unit 130.

The at least one processor unit 130 is configured, following a user input for the purpose of selecting an automated driving mode, to postpone activating the selected automated driving mode for a first time interval if the selected automated driving mode is available when selected by the user input; and following a user input for the purpose of selecting an automated driving mode, to postpone attempting to activate the selected automated driving mode for a second time interval if the selected automated driving mode is unavailable when selected by the user input.

The second time interval is in this case longer than the first time interval.

The first time interval, if the selected automated driving mode is available, may be for example 2 seconds or less, in particular 1 second or less. Due to the first time interval, a change thus does not take place to the active control mode immediately, but rather only after the predefined time has elapsed, even when the selected automated driving mode is available. This allows the user to skip successively through a list of automated driving modes, without each automated driving mode being activated immediately. In other words, the user is able to skip over automated driving modes without these being activated.

The second time interval, if the selected automated driving mode is unavailable, may be 10 seconds or less, in particular 5 seconds or less or 2 seconds or less.

Due to the longer second time interval between selection of and attempt to activate unavailable automated driving modes, the user has more time to recognize this circumstance and to select another (available) automated driving mode, without an attempt to activate the unavailable automated driving mode taking place. In a further case, it may be the case that the selected automated driving mode is only briefly unavailable. It may then be the case, due to the longer time interval between selection and activation attempt, that the activation attempt starts only when the initially unavailable selected automated driving mode is available again. As a result, it is possible to reduce the occurrence of error messages to the user indicating a failed activation attempt.

Figure 2A:
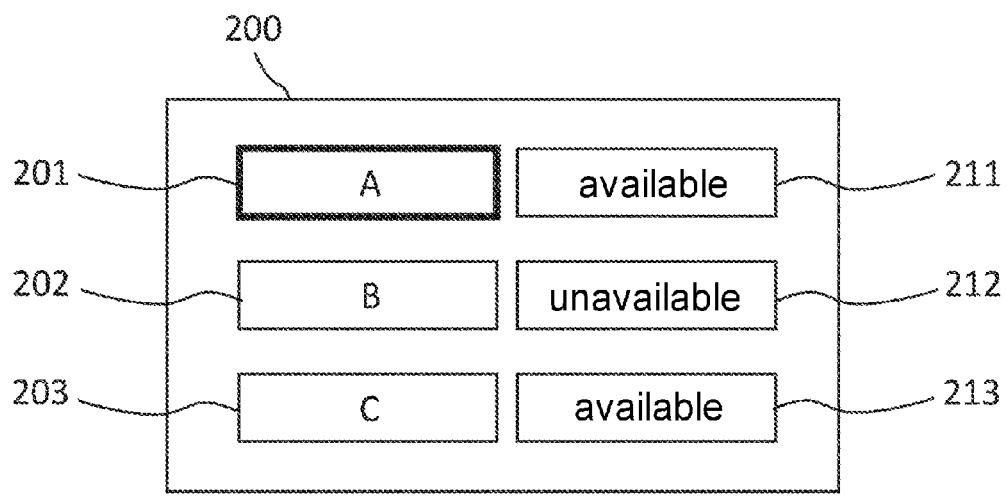
FIGS. 2A-C show a display device of a user interface of a driving assistance system according to examples of the present subject matter.
Figure 2B:
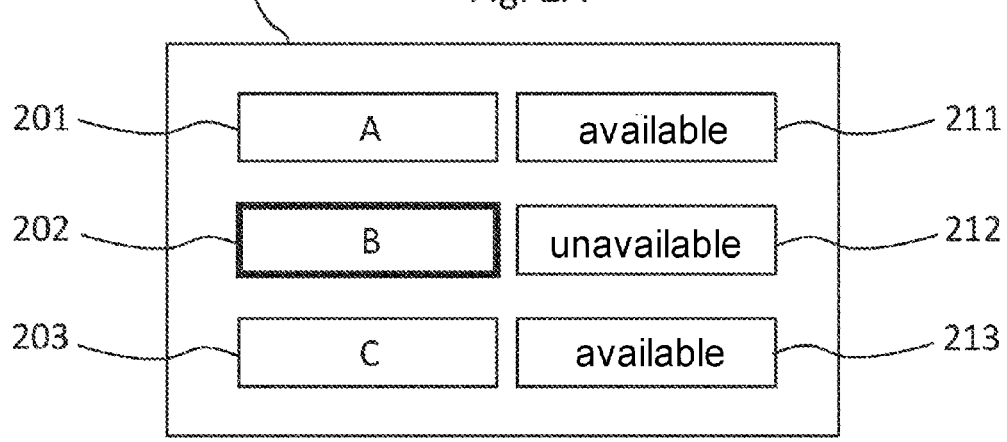
Figure 2C:
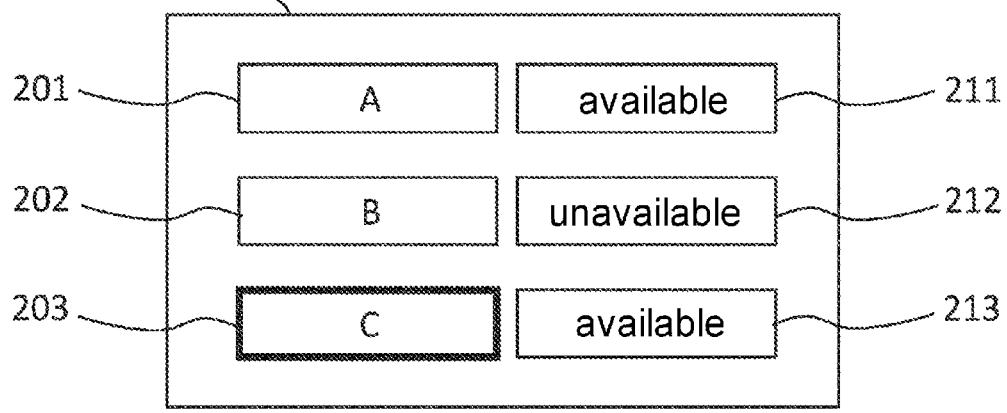

FIGS. 2A-C show a display device 200 of a user interface of a driving assistance system according to examples of the present subject matter.

The display device 200 of the user interface may be configured to display two or more different automated driving modes for selection by the user. In some examples, the display device 200 may be a display, such as for example a touchscreen. The display device 200 is typically installed in or on the dashboard of the vehicle. The display device 200 may for example be a head unit. In some examples, the display device 200 is an LCD display, a plasma display or an OLED display.

In some examples, the display device 200 may be configured to display a list of the two or more different automated driving modes. In the example of FIGS. 2A-C, three different automated driving mode 201, 202 and 203 are illustrated. The two or more different automated driving modes may for example be a speed limiter, a cruise control system, an automatic distance control system, a lane keep assistant or combinations thereof.

Optionally, the display of the two or more different automated driving modes comprises an availability state of each automated driving mode (for example "available" or "unavailable"). In other words, the user is able to be informed about the availability state of the individual driving modes. In the example of FIGS. 2A-C, a first automated driving mode 201 has a first availability state 211 ("available"), a second automated driving mode 202 has a second availability state 212 ("unavailable"), and a third automated driving mode 203 has a third availability state 213 ("available").

The different automated driving modes may be able to be selected successively. In particular, the user is able to skip successively through the list and select an automated driving mode through repeated user inputs, such as for example by actuating a mode switch.

For this purpose, the user interface may comprise an actuator that is provided for the user input for the purpose of selecting the automated driving modes and/or changing between automated driving modes.

The actuator may be a tactile actuation element, such as for example an individual switch, an individual button or a rotary knob. As an alternative, the actuator may be provided by the display device 200, which may be a touchscreen. In this case, for example, a separate display element (not shown) serving as actuator may be displayed on the display device 200 and actuated by the user.

If the user selects an available automated driving mode (illustrated in FIGS. 2A and C by the thicker frames at 201 and 203), the selected automated driving mode is activated after the first time interval, for example after around 1 second. Due to the first time interval, a change does not take place to the active control mode immediately, but rather only after the predefined time has elapsed. This allows the user to skip successively through the list of automated driving modes, without each automated driving mode being activated immediately. In other words, the user is able to skip over automated driving modes without these being activated.

If the user however selects an unavailable automated driving mode (illustrated in FIG. 2B by the thicker frame at 202), the automated driving mode is activated after the second time interval, for example after around 2 seconds.

Due to the longer second time interval between selection of and attempt to activate unavailable automated driving modes, the user has more time to recognize this circumstance and to select another automated driving mode, without an attempt to activate the unavailable automated driving mode taking place. In a further case, it may be the case that the selected automated driving mode is only briefly unavailable. It may then be the case, due to the longer time interval between selection and activation attempt, that the activation attempt starts only when the initially unavailable selected automated driving mode is available again. As a result, it is possible to reduce the occurrence of error messages to the user indicating a failed activation attempt.

In some examples, the user interface is furthermore configured to output a message to the user when the attempt to activate the selected automated driving mode after the second time interval has elapsed fails. The message may be output acoustically and/or optically and/or haptically to the driver, for example through an appropriate display on the display device 200.

Figure 3:
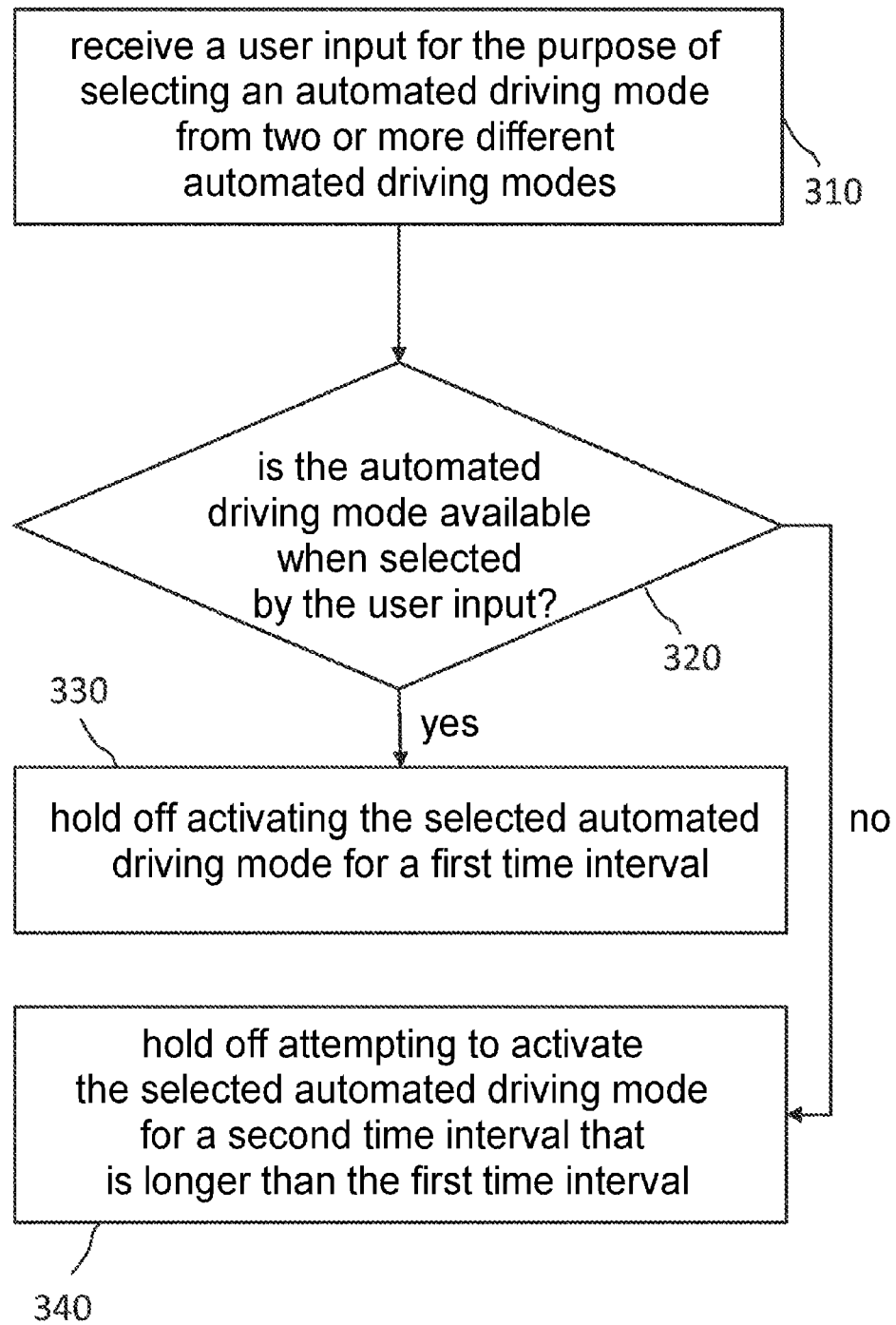
FIG. 3 shows a flowchart of a driving assistance method according to examples of the present subject matter.

FIG. 3 schematically shows a flowchart of a driving assistance method 300 for a vehicle according to examples of the present subject matter. The driving assistance method 300 may be implemented by appropriate software that is able to be executed by one or more processors (for example a CPU).

The driving assistance method 300 comprises, in block 310, receiving a user input for the purpose of selecting an automated driving mode from two or more different automated driving modes and/or changing from a first (currently active) automated driving mode to a second (currently not active) automated driving mode. The driving assistance method 300 furthermore comprises, in block 320, determining whether the selected automated driving mode is available when selected by the user input.

If the selected automated driving mode is available when selected by the user input, the method 300 postpones activating the selected automated driving mode for a first time interval (block 330).

If the selected automated driving mode is unavailable when selected by the user input, the method postpones attempting to activate the selected automated driving mode for a second time interval that is longer than the first time interval.

According to the present subject matter, different time intervals are provided for the activation of an automated driving mode selected by a user depending on whether or not the selected automated driving mode is available at the time of selection. If the selected automated driving mode is available at the time of selection, the time interval until activation is shorter than if the selected automated driving mode is unavailable. By way of example, it may be the case that the selected automated driving mode is only briefly unavailable. In this case, it may be the case, due to the longer time interval between selection and activation attempt, that the activation attempt starts only when the initially unavailable selected automated driving mode is available again. This makes it possible to reduce the occurrence of error messages to the user indicating a failed activation attempt.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Although the present subject matter has been explained and illustrated in more detail through preferred examples the present subject matter is not restricted by the disclosed examples, and other variations may be derived therefrom by a person skilled in the art without departing from the scope of protection of the present subject matter. It is therefore clear that there are a large number of variation possibilities. It is likewise clear that examples mentioned by way of example actually only constitute examples that should in no way be understood as limiting for instance the scope of protection, the application possibilities or the configuration of the present subject matter. On the contrary, the above description and the description of the figures give a person skilled in the art the ability to implement the examples in specific terms, wherein a person skilled in the art having knowledge of the disclosed concept of the present subject matter is able to make many changes, for example with regard to the function or the arrangement of individual elements mentioned in one example, without departing from the scope of protection, which is defined by the claims and their legal counterparts, such as for instance more detailed explanations in the description.

What is claimed is:

1. A driving assistance system for a vehicle, comprising:
   a user interface configured to receive a user input to select an automated driving mode from two or more different automated driving modes; and
   at least one processor configured to:
      in response to a user input to select a automated driving mode and the selected automated driving mode being available when selected by the user input, postpone activating the selected first automated driving mode for a first time interval, and
      in response to the user input to select the automated driving mode and the selected automated driving mode being unavailable when selected by the user input, postpone attempting to activate the selected automated driving mode for a second time interval,
      wherein the second time interval is longer than the first time interval.

2. The driving assistance system according to claim 1, wherein the two or more different automated driving modes are able to be selected successively using the user interface.

3. The driving assistance system according to claim 1, wherein the user interface comprises:
   a display device configured to display the two or more different automated driving modes for selection by a user.

4. The driving assistance system according to claim 1, wherein the user interface is configured to:
   output a message to a user when the attempt to activate the selected automated driving mode after the second time interval has elapsed fails.

5. The driving assistance system according to claim 1, wherein the first time interval is 2 seconds or less; and/or the second time interval is 10 seconds or less.

6. The driving assistance system according to claim 1, wherein the two or more different automated driving modes have a degree of automation according to SAE Level 1 or SAE Level 2.

7. The driving assistance system according to claim 1, wherein the two or more different automated driving modes are selected from:
   a speed limiter,
   a cruise control system,
   an automatic distance control system, and/or
   a lane keep assistant.

8. A motor vehicle comprising: the driving assistance system according to claim 1.

9. A driving assistance method for a vehicle, comprising:
   receiving a user input to select an automated driving mode from two or more different automated driving modes;
   determining whether the selected automated driving mode is available when selected by the user input; and
   in response to determining that the selected automated driving mode is available when selected by the user input, postponing activating the selected automated driving mode for a first time interval, and
   in response to determining that the selected automated driving mode is unavailable when selected by the user input, postponing attempting to activate the selected automated driving mode for a second time interval,
   wherein the second time interval is longer than the first time interval.

10. A non-transitory computer-readable medium comprising instructions operable, when executed by one or more computing systems, to:
   receive a user input to select an automated driving mode from two or more different automated driving modes;
   determine whether the selected automated driving mode is available when selected by the user input; and
   in response to the selected automated driving mode is available when selected by the user input, postpone activating the selected automated driving mode for a first time interval, and
   in response to the selected automated driving mode is unavailable when selected by the user input, postpone attempting to activate the selected automated driving mode for a second time interval,
   wherein the second time interval is longer than the first time interval.

* * * * *